(12) United States Patent
Ehlert

(10) Patent No.: US 6,290,024 B1
(45) Date of Patent: Sep. 18, 2001

(54) OIL MIST GENERATING SYSTEM

(75) Inventor: Charles W. Ehlert, Katy, TX (US)

(73) Assignee: Lubrication Systems Company of Texas, Inc., Houston, TX (US)

(*) Notice: Subject to any disclaimer, the term of this patent is extended or adjusted under 35 U.S.C. 154(b) by 0 days.

(21) Appl. No.: 09/518,631

(22) Filed: Mar. 3, 2000

(51) Int. Cl.$^7$ .................................................. F01M 5/00
(52) U.S. Cl. ..................... 184/6.26; 184/6.22; 239/135; 239/305; 239/418
(58) Field of Search ................... 184/6.22, 6.26, 184/50.2, 55.1, 58, 104.1; 239/135, 128, 302, 303, 304, 305, 307, 418, 419, 435

(56) References Cited

U.S. PATENT DOCUMENTS

| | | | |
|---|---|---|---|
| 2,867,376 | * | 1/1959 | Keir et al. ............................ 184/6.22 |
| 2,914,256 | * | 11/1959 | O'Shei ................................. 239/305 |
| 3,515,676 | * | 6/1970 | Hierta et al. ......................... 184/6.26 |
| 4,002,224 | * | 1/1977 | Easter ................................... 184/6.22 |
| 4,284,174 | * | 8/1981 | Salvana et al. ...................... 184/6.26 |
| 4,353,435 | * | 10/1982 | Abrams et al. ...................... 184/6.26 |
| 4,637,493 | * | 1/1987 | Ehlert ................................... 184/55.1 |
| 5,125,480 | * | 6/1992 | Gregory et al. ...................... 184/6.26 |
| 5,205,377 | * | 4/1993 | Pfarrwaller et al. ................. 184/6.26 |
| 5,318,152 | * | 6/1994 | Ehlert ................................... 184/6.26 |
| 5,718,744 | * | 2/1998 | Ehlert ...................................... 96/189 |
| 5,806,630 | * | 9/1998 | Bernal .................................. 184/6.26 |
| 5,948,968 | * | 9/1999 | Ehlert .................................... 73/30.04 |
| 6,065,689 | * | 5/2000 | Kizer et al. ............................ 239/126 |

* cited by examiner

Primary Examiner—David A. Bucci
Assistant Examiner—Chong H. Kim
(74) Attorney, Agent, or Firm—Bill B. Berryhill

(57) ABSTRACT

An improved oil mist generating system in which air and oil are supplied to a mist generator in which the air and oil are combined to form oil mist. The system is characterized in that the oil is alternately provided by a main oil reservoir and an auxiliary oil reservoir each of which is provided with a mist generator. Each mist generator is operatively associated with a control device for alternatively activating one of the mist generators while deactivating the other. Also disclosed is an oil mist generator which includes a heater manifold extending into an oil reservoir heating both air and oil prior to entry into a mist head in which the air and oil are combined to form an oil mist. Air and oil are introduced into the mist head through plates which are removable for replacement by plates of different sizes, allowing oil mist capacity to be changed.

21 Claims, 4 Drawing Sheets

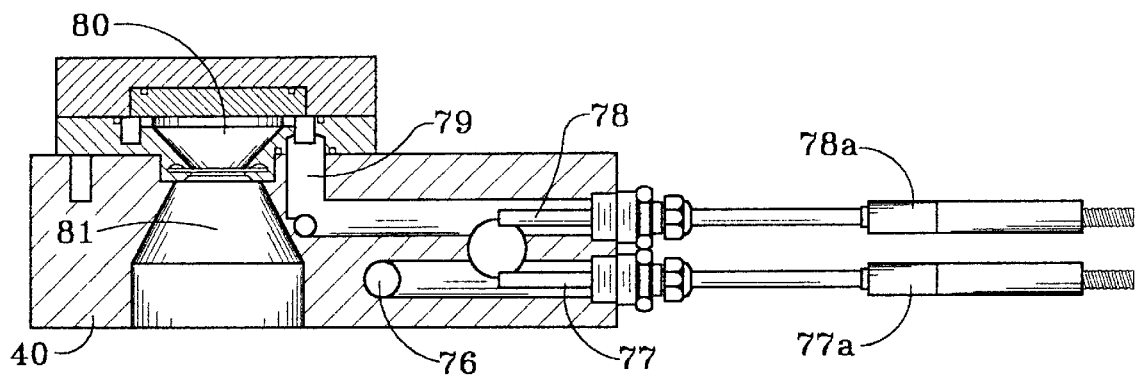
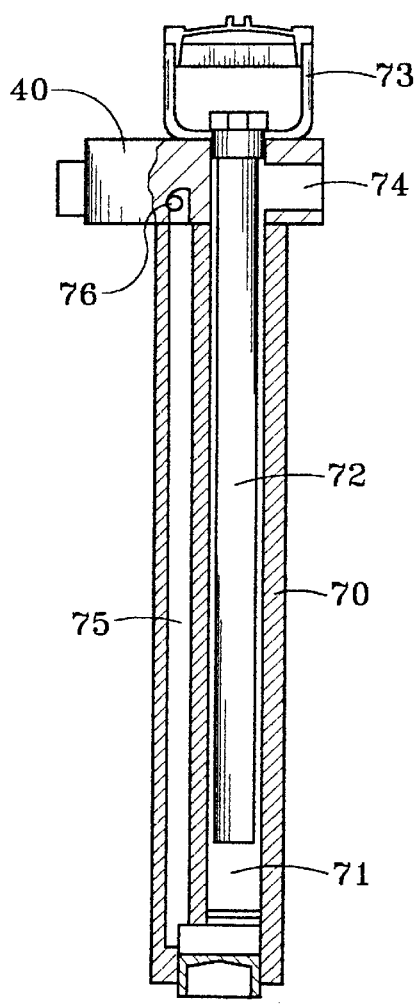
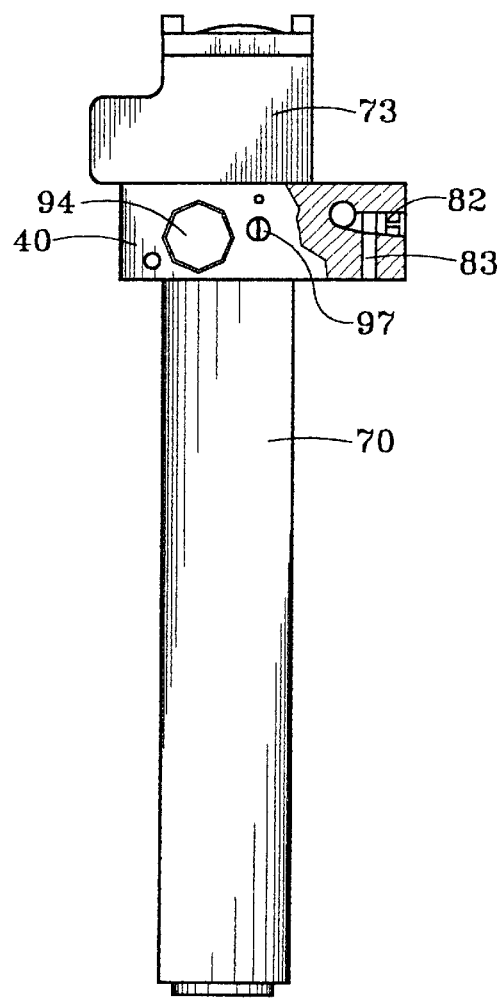

OIL MIST GENERATING SYSTEM

BACKGROUND OF THE INVENTION

1. Field of the Invention

The present invention pertains to lubrication systems. More specifically, the present invention pertains to lubricating systems in which lubricant is delivered in the form of oil mist to lubricate machinery bearings.

2. Description of the Prior Art

Oil mist lubrication is utilized in many industries to provide continuous, effective lubrication to the bearings of rotating equipment such as centrifugal pumps, electric motors, steam turbines, gear box, blowers, and fans. An oil mist lubrication system typically comprises an air supply for supplying a controlled source of pressurized air, an oil supply for supplying a source of oil and oil mist generation devices connected to the air and oil supply and by which the air and oil are combined to form oil mist for distribution through piping to the equipment. The oil mist continuously bathes the bearings of the equipment and maintains a slight positive pressure in the bearing housing to reduce contamination from outside sources. If the lubricating system functions properly, bearing life is extended, equipment downtime and maintenance costs are reduced.

Efficient operation of an oil mist system requires that the equipment receive a reliable continuous supply of lubricant while minimizing two important variables: the amount of oil consumed and the amount of spray mist escaping to the outside environment. When oil mist is generated the oil is atomized into very fine particles and can be conveyed long distances in a properly designed header system with minimum wetting out on the walls of the pipe in which it is being conveyed. These fine particles, referred to as "dry mist", must be converted into larger particles, known as "wet mist", in order to wet out on the metal surfaces of the equipment being lubricated. This is accomplished by passing the mist through a specially designed restriction orifice known as a reclassifier. The reclassifier reduces turbulence in the stream to convert small particles into larger ones before the mist enters the equipment bearing housing. These reclassifiers serve the additional purpose of metering the amount of lubricant to each bearing to avoid over or under lubricating. Some oil mist particles, particularly the smallest ones, do not wet out on the metal surfaces of the equipment being lubricated. Instead, they sometimes pass through the bearing housings and are vented into the atmosphere. Thus, supplying sufficient oil without over consumption and minimizing stray mist contamination of the environment are important considerations in any oil mist lubrication system.

In recent years, oil mist lubrication systems have been provided with microprocessor controls by which the various conditions of the air supply, the oil supply and oil mist may be monitored and controlled. Such monitoring and control improves the reliability of the oil mist supply, allows faster and more accurate problem identification and provides tighter control over operating variables, thus eliminating many of the problems of the prior art. Such a system is described in U.S. Pat. No. B1 5,125,480. Oil mist generators suitable for use in such systems typically provide heated air from the air supply and warm oil from the oil supply to the vortex of a mist head. Air enters the vortex creating a negative pressure by which oil is drawn into and disbursed into the air as fine oil mist droplets which are discharged into an air space above an oil reservoir for eventual distribution through piping to the equipment to be lubricated.

Even though substantial strides have been made in oil mist lubrication systems, further improvements are needed. For example, if the generation of oil mist is interrupted for any of a number of reasons, it may be necessary to shut the system down for repairs or adjustments to correct the situation. This may result in periods of time when the equipment is not being lubricated. It may even require that the equipment be shut down. Furthermore, if a number of pieces of equipment are being lubricated and some of the equipment is removed or shut down or additional equipment is added to the system, it may be necessary to change the capacity or output of the oil mist generator. In many cases this may require changing out the entire mist head. In addition more compact and efficient means of heating the air and oil prior to entering the oil mist head would be desirable.

SUMMARY OF THE PRESENT INVENTION

The present invention comprises an improved oil mist generating system which provides an air supply, supplying a controlled source of pressured air, an oil supply for supplying a source of oil and oil mist generation means by which air and oil are combined to form oil mist for distribution through piping to the equipment to be lubricated. The system is further characterized by several improvements. The oil supply includes a main oil reservoir and an auxiliary oil reservoir. The oil mist generation means includes a main mist generator and an auxiliary mist generator connected to the main oil reservoir and the auxiliary oil reservoir, respectively. Each of the oil mist generators are connected to the air supply. Air from the air supply and drops of oil from either the main oil reservoir or the auxiliary oil reservoir are combined in a respective one of the main mist generator and the auxiliary mist generator to provide the oil mist for lubricating the equipment. A control device is operatively associated with the oil mist generation means for alternatively activating one of the main mist generator and the auxiliary mist generator while deactivating the other. Thus, a main mist generator and an auxiliary or back up mist generator and associated oil reservoirs, are combined in one unit allowing switching from one to the other without interrupting lubrication of equipment.

In addition, both the main and the auxiliary mist generators of the present invention comprise a mist head and a heater manifold, the mist head being attached to an upper portion of its respective oil reservoir and the heater manifold extending downward from the mist head into oil contained in the reservoir. The heater manifold is provided with a heating element which heats both air and oil passing through vertical passages therein prior to the air and oil entering the mist head. The mist head of each of the oil mist generators comprises a vortex chamber in which the heated air is directed and an orifice where the heated air is combined with heated oil, exiting as oil mist into its respective oil reservoir. Both the air and oil enter the vortex chamber and orifice through separate plates which are sized to permit specific amounts of air and oil. The plates are removable, allowing the capacity of the mist generator to be changed by simply replacing the air plates and oil plates with ones of different sizes. Thus, it is not necessary to change out the entire mist head.

Utilizing the improvements of the present invention results in an improved oil mist generating system which is more reliable and efficient than those of the prior art and much easier to adapt to changing capacity requirements. Many other objects and advantages of the invention will be apparent from reading the description which follows in conjunction with the accompanying drawings.

DESCRIPTION OF THE DRAWINGS

FIG. 6 is an elevation view, partially in section, of a mist head and heater manifold making up an oil mist generator, according to a preferred embodiment of the invention, and specifically for illustrating flow of air therein;

FIG. 7 is a sectional view of the mist head portion of the oil mist generator of FIG. 6;

FIG. 8 is another elevation view, a small part of which is in section, further illustrating the oil mist generator of FIG. 6 and rotated ninety degrees therefrom;

DESCRIPTION OF A PREFERRED EMBODIMENT OF THE INVENTION

Figures 1, 2:
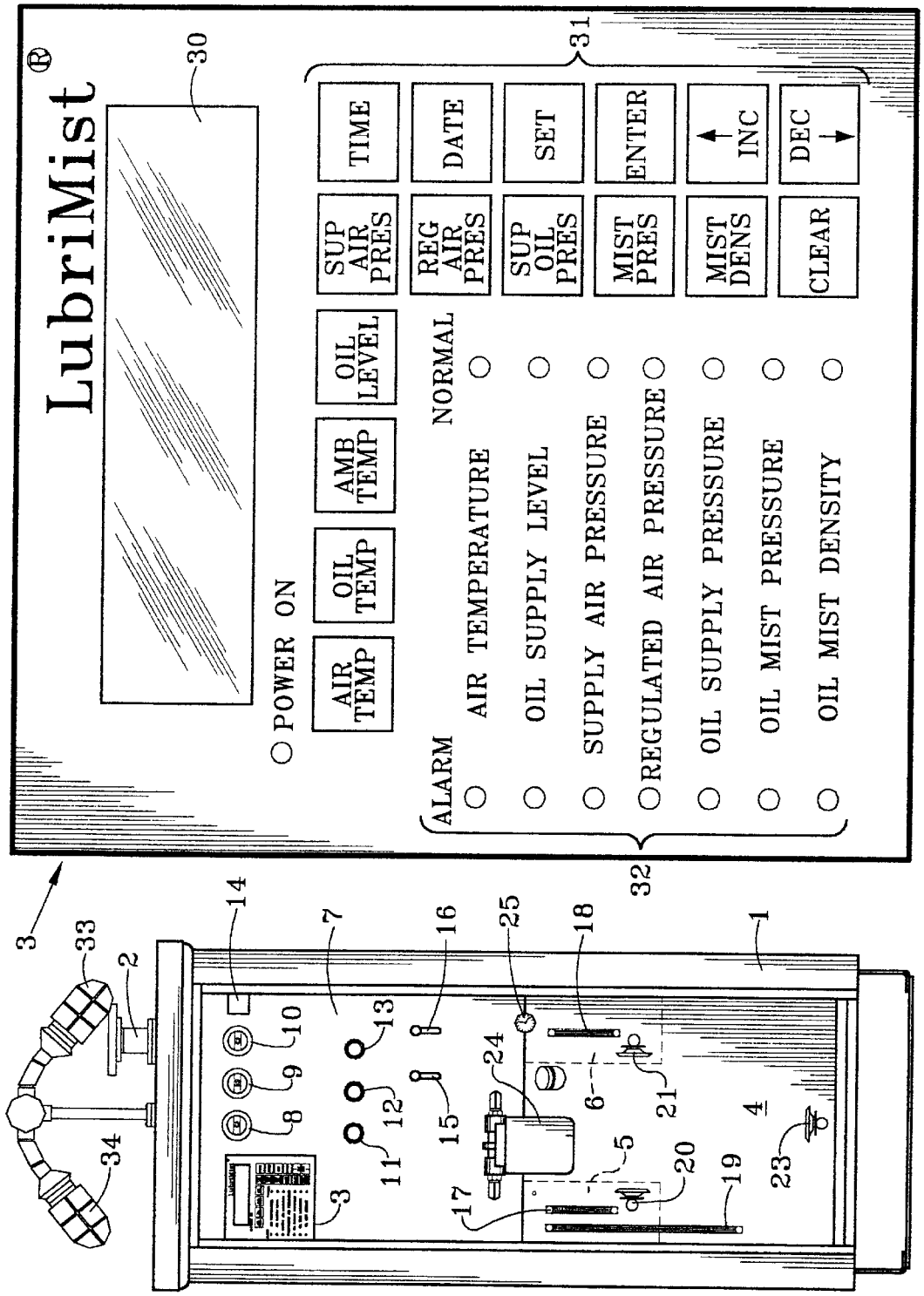
FIG. 1 is an elevation view of a lubricating system console, housing components of an improved oil mist generating system, according to a preferred embodiment of the present invention.
FIG. 2 is an enlarged view of the operator keypad and display mounted on the console of FIG. 1.

Referring first to FIG. 1, there is shown a console 1 in which the components of the improved oil mist generating system of the present invention are housed. All these components are combined to provide an air supply for supplying a controlled source of pressurized air, an oil supply for supplying a source of oil and oil mist generators connected to the air supply and the oil supply and by which air and oil are combined to form oil mist for distribution through an outlet 2 and connected piping (not shown) for distribution to the equipment (not shown) to be lubricated. The entire system is monitored and controlled by a microprocessor which monitors and controls temperature, pressure and density operating variables of the system. The monitoring and controlling is operator interfaced from a keypad and display 3 mounted on the front panel 7 of the console 1. The keypad and display 3 will be described more fully hereafter with reference to FIG. 2.

As previously stated, the console 1 houses, among other things, an oil supply. The oil supply comprises a large bulk oil reservoir 7, a smaller main oil reservoir 5 and a smaller auxiliary oil reservoir 6. Both the main and auxiliary oil reservoirs 5 and 6 are supplied with oil from the bulk oil reservoir 4 through a pump, not shown. The auxiliary oil reservoir 6 is totally enclosed. The main oil reservoir is substantially enclosed but is open at one upper side thereof so that the upper space thereof communicates with the upper space of the bulk oil reservoir 4.

Several components of the system are visible and accessible from the front panel 7 of the console 1. They include operating handles 8, 9 and 10 of valves through which air is supplied to a main oil mist generator, an oil supply pump and an auxiliary oil mist generator. Manual adjustment knobs 11, 12 and 13 are from air pressure regulators which control the supply air pressure to the main oil mist generator, the oil supply pump and the auxiliary oil mist generator, respectively. An air heater controller 14 for the auxiliary oil mist generator air/oil heater is also visible. Manual toggle valves 15, 16 are provided for manually filling the main oil and auxiliary oil reservoirs. Separate oil level indicators 17, 18 and 19 are provided to monitor the level of oil in the main oil reservoir, the auxiliary oil reservoir and the bulk oil supply reservoir, respectively. Each reservoir compartment is also equipped with a plugged drain valve 20, 21 and 23, respectively. As oil is transferred from the bulk oil reservoir 4 to either of the main oil reservoir 5 or auxiliary oil reservoir 6 it passes through an oil filter 24. A mist pressure gauge 25 is provided for monitoring mist header pressure when the auxiliary oil mist generator is in operation.

As previously indicated, the entire system is controlled by a programmable solid state controller. The controller and the operation thereof is substantially the same as disclosed in U.S. Pat. No. B1 5,125,480 and does not form a part of the present claimed invention. It is of course important in operating the overall system. The operator interface keypad and display, generally represented at 3 in FIG. 1, which is associated with the programmable solid state controller is shown in more detail in FIG. 2. It comprises a liquid crystal display (LCD) 30 which displays operating status and alarm variable values. A keypad with 16 membrane-type buttons 31 allows the user to access variables and select various aspects specific to the operation of the oil mist generator. LED light enunciators 32 show the status of each variable. The status is indicated as either in alarm or normal condition. The alarm status of any of these variables is also indicated by an overhead red status light 33 above console 1. Normal is indicated by overhead green status light 34. (See FIG. 1 for these lights). The 16 membrane-type buttons located on the keypad perform the following functions:

AIR TEMP—When depressed this key displays, in real time, the air temperature as it enters the vortex mist generator. This temperature is the temperature of the exiting air after heating by an air heater element.

OIL TEMP—When depressed this key displays, in real time, the temperature of the oil contained within the bulk oil storage tank.

AMB TEMP—When depressed this key displays, in real time, the ambient temperature outside of the console cabinet. The temperature sensor is located on the rear of the cabinet.

OIL LEVEL—When depressed displays the oil reserve in the bulk oil reservoir.

SUP AIR PRES—When depressed this key displays inlet air pressure being supplied to the inlet air connection of the system.

REG AIR PRES—When depressed this key displays the air supply pressure being supplied to the main oil mist generator.

SUP OIL PRES—When depressed this key displays the oil transfer pump outlet pressure. When the pump is idol, the pressure is static.

MIST PRES—When depressed this key displays the mist outlet pressure. This is pressure of the mist supply being discharged and distributed to user equipment.

MIST DENS—When depressed this key displays a numeric value relative to the mist density, i.e. oil/air (%).

CLEAR—Used to clear an alarm condition or to return to run mode while in programming mode. Press after correcting an alarm condition. Pressing the CLEAR key once clears an alarm. Pressing the CLEAR key a second time clears the overhead status lights from red to green.

TIME—When depressed this key displays the current date and time. This key is also used during time editing.

DATE—When depressed this key displays the current date and time (DAY:DATE:MONTH:YEAR). This key is also used during date editing.

SET—Used to initiate an alteration to a set value for a variable or pre-programmed solvent setting.

ENTER—Used to log altered set values for variables and options into Random Access Memory (RAM). Also used as a confirmation while navigating within the program.

INC |—Used to increase a value to be changed. This key can be toggled manually by pressing rapidly or automatically by holding down the key.

DEC ↑—Used to decrease the value to be changed. This key can be toggled manually by pressing rapidly or automatically by holding down the key.

There are sensors, of course, for sensing the temperature, pressures, densities, etc. indicted by these buttons and enunciators. They are similar to those described in U.S. Pat. No. B1 5,125,480 and will not be described in detail here since they are not in themselves part of the invention.

Figure 3:
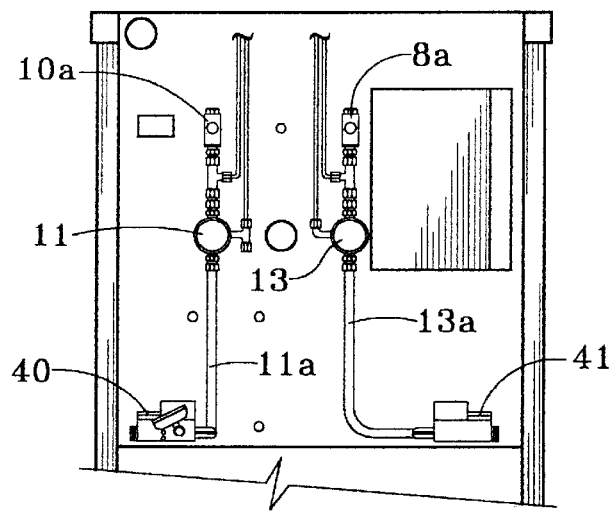
FIG. 3 is a sectional rear view of an upper portion of the console panel of FIG. 1 showing components of the air supply and oil mist generating systems thereof.

Inlet air for the system enters from the rear of the console, filtered through an in-line filter, into a distribution manifold (not shown). The manifold serves to distribute air to three separate valves, the handles for which 8, 9 and 10 are illustrated in FIG. 1. Two of these valves 8a and 10a, are shown in FIG. 3. These valves supply air through air pressure regulators 11 and 13 via conduits 11a and 13a to mist heads 40 and 41 of a main oil mist generator and an auxiliary oil mist generator, respectively. Each of the oil mist generators is connected to a separate oil reservoir, the main oil mist generator being connected to the main oil reservoir 5 and the auxiliary oil mist generator being connected to the auxiliary oil reservoir 6. Both oil mist generators are mechanically identical. They feature an in-line air heater element for heating and maintaining the air supply to control temperature and will be more fully described hereafter.

When either one of the oil mist generators is operating, it produces an oil mist which is discharged into the upper space of the main oil and the auxiliary oil reservoirs 5, 6 respectively. The upper space of the main oil reservoir 5 is in communication with the upper space of the larger bulk oil reservoir 4. The upper space of the auxiliary oil reservoir 6 is isolated from the other oil reservoirs.

Figure 4:
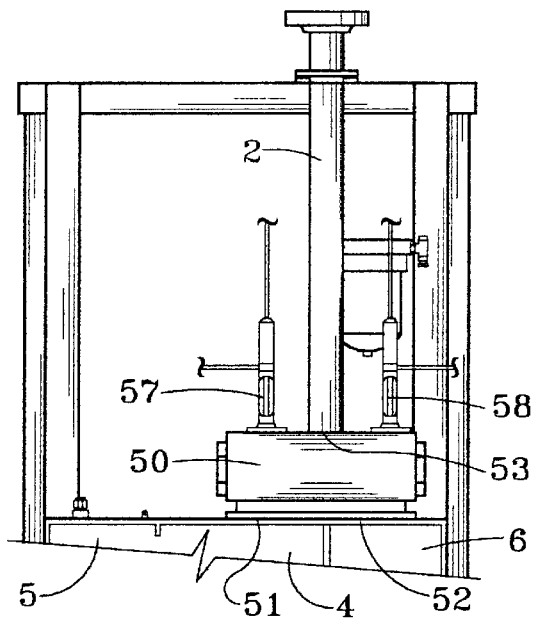
FIG. 4 is another sectional view of an upper portion of the console of FIG. 1 showing valve components by which oil mist generated within the console is directed for distribution through piping to equipment to be lubricated.
Figure 5:
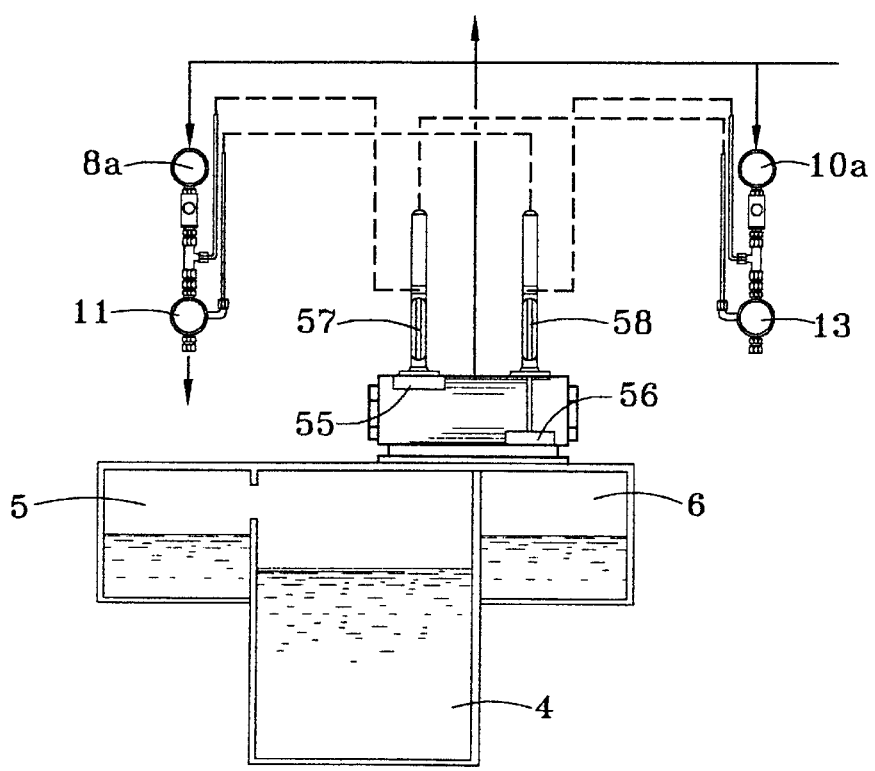
FIG. 5 is a schematic representation of the valve components of FIG. 4 and the means for controlling the operation thereof.

As best seen in FIG. 4, a specially designed outlet switching valve 50 controls the flow of oil mist through the discharge piping 2 and the distribution-piping network (not shown) which supplies oil mist to the user equipment (machinery) for bearing lubrication. The switching valve 50 has two inlets 51, 52, one 51 of which communicates with the upper space of the main and bulk oil reservoir 5, 4 and the other 52 of which communicates with the upper space of the auxiliary oil reservoir 6. A single outlet 53 communicates with the discharge piping 2. Each of the inlets 51, 52 is provided with a valve port which cooperates with poppet valves 55, 56, as best seen in FIG. 5. Each of the poppet valves 55, 56 is operated by a pneumatic operator 57, 58 which moves its respective poppet valve between an open position, such as shown for the valve 55 in FIG. 5 and a closed position, such as shown by the valve 56 in FIG. 5. As air is supplied to either of the main oil mist generator or the auxiliary mist generator air, is also supplied to a respective pneumatic operator 57, 58 of the switching valve 50, automatically opening one of the valves and closing the other. For example as illustrated in FIG. 5, air is being supplied to the main oil mist generator and the pneumatic operator 57, opening the poppet valve 55 and allowing oil mist to flow from the main oil reservoir through port 51 and the mist outlet 53 for distribution through the piping to the equipment to be lubricated. During this time, the valve 56 to the auxiliary oil reservoir is automatically closed. Likewise, when the auxiliary oil mist generator is put on line, the supply air pressure opens the valve 56 and the valve 55 is automatically closed. If air supply valves to both oil mist generators are inadvertently placed in an open position at the same time, air is supplied to both operators 57 and 58 opening both of the poppet valves 55 and 56.

Two very important components of the oil mist generating system of the present invention are the main oil mist generator and the auxiliary oil mist generator, the heads of which are indicated at 40 and 41 in FIG. 3. As previously indicated, both of these oil mist generators are mechanically identical. For this reason, only one will be described in detail with reference to FIGS. 6–11. The main oil mist generator comprises a mist head body 40 (a block of machined aluminum) extending downwardly from which is a heater manifold 70 of machined aluminum rod. There is in the heater manifold 70 a vertical cylindrical cavity 71 in which is installed an air heater element 72. The air heater element 72 is provided, through an electrical box 73, with electricity controlled to heat the air heater element 72 to desired temperatures for heating and maintaining air (and oil) at controlled temperatures.

FIGS. 6–8 illustrate components of the oil mist generator associated with air. Air enters the mist head 40 from the air supply through a port 74. The air is channeled vertically downward around the heater element 72 and through the cavity 71 of the heater manifold where it is heated. The heated air reaching the bottom of the cavity 71 is redirected upwardly through a passageway 75 to a port 76. The heated air passes through the port 76 horizontally to a high temperature sensor 77 and up and over a heater control element 78. (See FIG. 7) Both the high temperature sensor 77 and heater control element 78 are connected to the solid state controller of the system via, electrical connections 77a and 78a, to maintain a desired air temperature and provide for alarm functions. The conditioned air then passes to port 79 where it is ready to be used for oil mist generation in a vortex 80 discharging through an orifice (111 in FIG. 11) and a downwardly diverging frusto-conical chamber 81 into the upper space of the main oil reservoir with which the main oil mist generator is associated. The auxiliary oil mist generator would, of course, discharge into the upper space of the auxiliary oil reservoir.

FIG. 8 shows an air bypass needle valve 82. This valve is used to control mist density by adding clean air to the oil mist. Air therefrom is simply discharged to the port 83 into the upper space (the oil mist space) of the main oil reservoir.

As air flows through the vortex 80, a negative pressure is induced through porting, as will be more fully understood hereafter, to draw oil into the mist head for mixing with the air passing through the vortex 80.

Figures 9, 10:
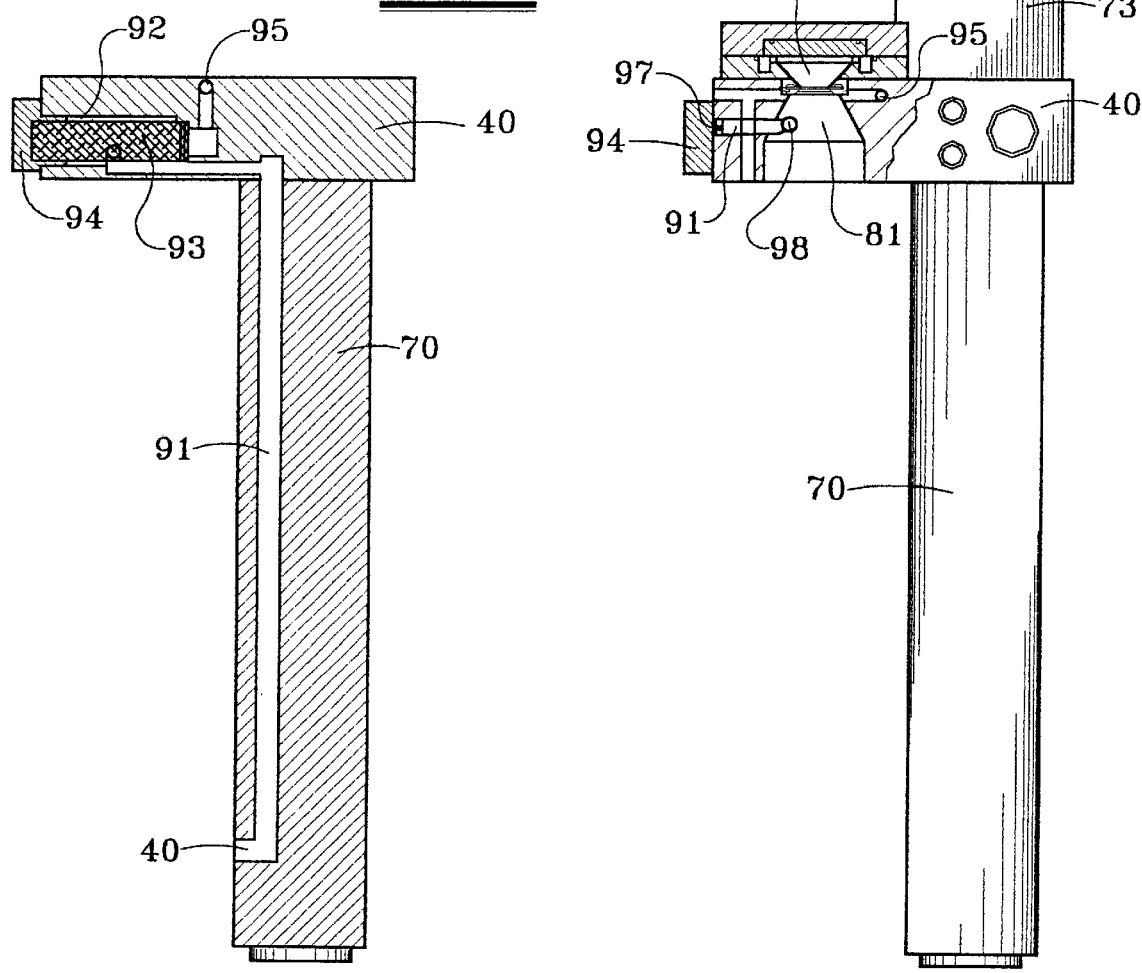
FIG. 9 is an elevation view,in section, similar to FIG. 6, but illustrating oil flow in the oil mist generator of the present invention.
FIG. 10 is an elevation view, partially in section, further illustrating oil flow in the oil mist generator of the present generation.

Referring now to FIGS. 9 and 10, aspects of the main oil generator associated with oil supply will be more fully described. The heater manifold 70 extends into the oil reservoir, in this case the main oil reservoir. Oil enters through a port 90 and travels upwardly through a passageway 91 in the heater manifold 70. Since the heater manifold 70 has been heated by warmed air and by radiated heat from the heater element 72, the heater manifold 70, made of aluminum, transfers heat to the oil as it moves up the passageway 91. The heated oil enters a cavity 92 in which is provided a suction screen 93. Access to the cavity 92 and suction screen 93 is provided through a cap 94. The oil suction screen 93 strains any large foreign matter out of the oil stream. As the oil is strained, it moves to port 95. As best seen in FIG. 10, the oil moves across port 95 and is delivered into an oil gap below the vortex 80 as will be more fully understood hereafter with reference to FIG. 11. An oil flow adjustment screw 97 connects the oil supply passage 91 to the frusto-conical area 81 which discharges into the upper space of the main oil reservoir. The exiting oil mist spirals downwardly in a clockwise direction.

Figure 11:
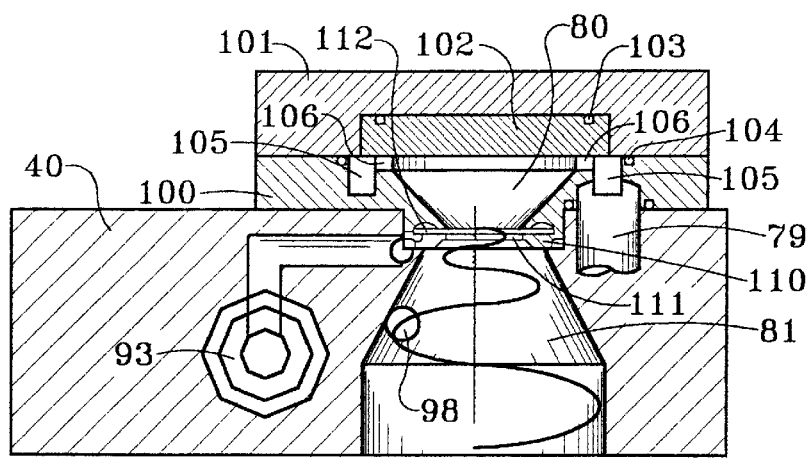
FIG. 11 is a sectional view of the mist head of the oil generator of FIGS 6–10, rotated ninety degrees from FIGS 9 and 10, showing the mixing of oil and air therein in greater detail.

Referring now to FIG. 11, the oil mist head 40, the vortex 80, the downwardly diverging frusto-conical discharge area 81 and the associated inner parts are shown in larger scale with greater detail. Air enters the head 40 through the port 79. The vortex is machined in a vortex plate 100 on top of which is a cover 101. A circular air cap 102 is inserted into the cover 101 and sealed around its edges by an o-ring seal 103. An o-ring seal 104 seals between the vortex plate and the cover 101. There is a circular groove 105 surrounding the vortex in the vortex plate. A series of tangential slots 106 are machined in the vortex plate 100 to connect the air groove 105 to the inner vortex chamber 80. Air passes from the port 79 into the groove 105 and through the tangential slots 106 into the vortex 80. The air enters the vortex 80, tangentially to the inside diameter thereof, and spirals as it moves through the vortex increasing in speed until it exits the bottom of the vortex 80.

Below the vortex plate 100 is an oil cap 110. The oil cap 110 provides an orifice 111. It will be noted that there is a gap 112 provided between the vortex plate 100 and the oil cap 110. The oil gap 112 is in communication with port 95 through which oil is provided. As the heated air spirals and exits the vortex 80 at high speed, it passes through the orifice 111 of the oil cap 110. The moving air stream creates a negative pressure in the gap 112 drawing oil from the oil reservoir through the port 95. When the oil flow adjustment screw 97 (see FIG. 10) is opened, the spiraling air passes over a port 98 therein. The air flow tends to have a Pitot tube effect on the port tending to draw oil from the port 98. This provides better control of oil flow being supplied to the gap 112 between the vortex plate 100 and the oil cap 110. The air and oil are combined to produce oil mist which discharges into the upper space of a respective main oil reservoir or auxiliary oil reservoir for eventual discharge through a network of distribution piping to the equipment being lubricated thereby.

It is important to note that both the vortex plate 100 and the oil cap 110 are easily removable from the mist head 40. Thus the vortex plate 100 and the oil cap 110 may be removed and replaced by similar components of different size and configuration. This allows the amount of air and oil and, consequently, the oil mist generating capacity to be changed by simply changing one or both of these components without having to change out the entire mist head or mist generator.

The provision of two separate oil reservoirs, a main oil reservoir and an auxiliary oil reservoir and two separate oil mist generators, a main oil mist generator and an auxiliary oil mist generator, and an associated automatic switching valve provides redundancy, in a single unit, which allows maintenance and repair operations to be conducted on the unit without interrupting the flow of oil mist to the equipment being lubricated thereby. The system is thus safer, more efficient and easier to operate and maintain than those of the prior art. Its flexibility is superior to those systems of the prior art.

The design of the oil mist generators is unique, providing a heater manifold for heating both air and oil and providing a mist head with removable parts for changing air, oil and oil mist capacity and characteristics without having to change the entire mist head or generator. Better control of oil and air are provided by additional control elements.

A single embodiment of the invention has been described herein. However, many variations thereof can be made by those skilled in the art without departing from the spirit of the invention. Accordingly, it is intended that the scope of the invention be limited only by the claims which follow.

What is claimed is:

1. An improved oil mist generating system for delivering oil mist to lubricate equipment, said system comprising air supply means for supplying a controlled source of pressurized air, oil supply means for supplying a source of oil and oil mist generation means connected to said air supply means and said oil supply means and by which air and oil are combined to form oil mist for distribution through piping to said equipment, said system being characterized in that:

said oil supply means comprises a main oil reservoir and an auxiliary oil reservoir;

said oil mist generation means comprising a main mist generator and an auxiliary mist generator connected to said main oil reservoir and said auxiliary oil reservoir, respectively, and each of which is connected to said air supply means, air from said air supply means and drops of oil from said main oil reservoir and said auxiliary oil reservoir being combined in a respective one of said main mist generator and said auxiliary mist generator to provide said oil mist for lubricating said equipment; and control means operatively associated with said oil mist generation means for alternately activating one of said main mist generator and said auxiliary mist generator while deactivating the other.

2. An improved oil mist generating system as set forth in claim 1 in which each of said main oil reservoir and said auxiliary oil reservoir have outlets through which oil mist generated by said oil mist generation means may be discharged into said piping for said distribution to said equipment, said control means comprising a switching valve to which said outlet of each of said main oil reservoir and said auxiliary oil reservoir is connected, said switching valve being operable to close either of said outlets while opening the other, simultaneously effecting alternative activation of one of said main mist generator and said auxiliary mist generator while deactivating the other.

3. An improved oil mist generating system as set forth in claim 2 in which each of said main oil mist generator and said auxiliary oil mist generator is connected to said air supply means through main and auxiliary air pressure regulators, respectively, said regulators being controlled so that when one of said regulators is supplying air to its respective oil mist generator the other of said regulators is closed preventing air from being supplied to the other of said oil mist generators.

4. An improved oil mist generating system as set forth in claim 2 in which said switching valve comprises a pair of valves, a main valve and an auxiliary valve, each of said main valve and said auxiliary valves being moveable between opened and closed positions in response to said control means so that when said main valve is opened said auxiliary valve is closed and when said auxiliary valve is opened said main valve is closed, said opening and closing of said main and said auxiliary valves opening and closing respective outlets of said main and said auxiliary oil reservoirs and effecting said alternative activation of one of said main and said auxiliary mist generators while deactivating the other.

5. An improved oil mist generating system as set forth in claim 1 in which said oil supply means comprises a bulk reservoir and an oil pump connected to each of said main and said auxiliary oil reservoirs for supplying oil thereto, at least said main oil reservoir being provided with an oil level sensor for activating and deactivating said oil pump in response to predetermined low and high oil levels therein.

6. An improved oil mist generating system as set forth in claim 1 in which each of said main and said auxiliary mist generators comprises a mist head and a heater manifold, said mist head being attached to an upper portion of a respective one of said main oil reservoir and said auxiliary oil reservoir, said heater manifold extending downwardly from said mist head into oil contained in said reservoir.

7. An improved oil mist generating system as set forth in claim 6 in which said heater manifold comprises a vertical cavity in which is inserted a heating element to heat said manifold and oil and air passing therethrough to said mist head.

8. An improved oil mist generating system as set forth in claim 7 in which the cross-sectional area of said vertical cavity is greater than the cross-sectional area of said heating element leaving an annular space through which air may pass from said air supply means for heating thereof prior to entry into said mist head for combining with said drops of oil.

9. An improved oil mist generating system as set forth in claim 8 in which the lower end of said heater manifold is provided with a port which communicates with a vertical oil passage through which oil passes from said reservoir for heating thereof prior to entry into said mist head for combining with heated air therein.

10. An improved oil mist generating system as set forth in claim 8 in which said heater manifold is provided with a vertical air passage which communicates with said vertical cavity and through which air passes from said annular space surrounding said heating element prior to said entry into said mist head.

11. An improved oil mist generating system as set forth in claim 7 in which said mist head comprises a downwardly converging vortex chamber and a downwardly diverging frusto-conical chamber between which is an orifice, said heated air being directed into said vortex chamber, passing through said orifice where it is combined with said heated oil, exiting said frusto-conical chamber as oil mist into its respective oil reservoir.

12. An improved oil mist generating system for delivering oil mist to lubricate equipment, said system comprising air supply means for supplying a controlled source of pressurized air, oil supply means for supplying a source of oil and mist generation means connected to said air supply means and said oil supply means and by which air and oil are combined to form oil mist for distribution through distribution piping to said equipment, said system being characterized in that:

said oil supply means comprises at least one reservoir of oil having a space above a level of oil therein into which oil mist is discharged from said mist generation means prior to said distribution through said piping; and said mist generation means comprises at least one mist head attached to an upper portion of said reservoir and a heater manifold extending downwardly from said mist head into the oil in said reservoir, both air and oil from said air supply means and said oil reservoir, respectively, passing through said heater manifold for heating thereof prior to entry into said mist head where said air and oil are combined to form said oil mist.

13. An improved oil mist generating system as set forth in claim 12 in which said heater manifold comprises a heating element which is removably disposed in a cavity within said manifold.

14. An improved oil mist generating system as set forth in claim 13 in which said air passes around said heating element and through an air passage in said manifold as it flows from said air supply means to said mist head for said combining with said oil therein.

15. An improved oil mist generating system as set forth in claim 12 in which said heater manifold is provided with a port near the lower end thereof and below the level of oil in said reservoir which communicates with an oil passage in said manifold through which said oil passes from said reservoir to said mist head for combining with said air therein.

16. An improved oil mist generating system as set forth in claim 15 in which said mist head comprises a vortex chamber into which said heated air enters and is discharged through an orifice creating a partial vacuum which draws oil from said oil passage for combining with said heated air as said air and oil pass through said orifice.

17. An improved oil mist generating system as set forth in claim 16 in which said mist head comprises a vortex plate having a circular air channel and a series of tangential slots through which said heated air enters said vortex in a spiral motion.

18. An improved oil mist generating system as set forth in claim 17 in which said vortex plate is removable for replacement by another plate, allowing the amount of air entering said mist head to be regulated by changing to vortex plates of different air flow characteristics.

19. An improved oil mist generating system as set forth in claim 16 in which said orifice is carried in an oil plate, a gap being provided between said orifice and said vortex chamber which communicates with said oil passage and through which heated oil is drawn by said partial vacuum for combining with said heated air to form said oil mist.

20. An improved oil mist generating system as set forth in claim 19 in which there is also a bypass port through which said oil passage may communicate with a downwardly diverging frusto-conical chamber below said orifice, said bypass port being provided with an adjustable flow control device by which some of said heated oil may flow into said frusto-conical chamber in a more controllable manner.

21. An improved oil mist generating system as set forth in claim 19 in which said oil plate is removable for replacement by another plate, allowing the amount of oil entering said mist head to be regulated by changing to oil plates of different oil flow characteristics.

* * * * *